United States Patent
Kwon et al.

(10) Patent No.: US 11,453,775 B2
(45) Date of Patent: Sep. 27, 2022

(54) THERMOPLASTIC ELASTOMER RESIN COMPOSITION

(71) Applicant: SAMYANG CORPORATION, Seoul (KR)

(72) Inventors: Jae-Kwan Kwon, Sejong (KR); Jin Yoo, Cheongju-si (KR); Cheol-Han Lee, Chungcheongnam-do (KR); Yong-Chan Lim, Gwacheon-si (KR); Sang-Hyun Park, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 0 days.

(21) Appl. No.: 16/958,551

(22) PCT Filed: Dec. 27, 2018

(86) PCT No.: PCT/KR2018/016716
§ 371 (c)(1),
(2) Date: Jun. 26, 2020

(87) PCT Pub. No.: WO2019/132534
PCT Pub. Date: Jul. 4, 2019

(65) Prior Publication Data
US 2021/0061991 A1    Mar. 4, 2021

(30) Foreign Application Priority Data

Dec. 29, 2017 (KR) .......................... 10-2017-0184532

(51) Int. Cl.
| | | |
|---|---|---|
| *C08L 67/02* | (2006.01) | |
| *C08K 5/3492* | (2006.01) | |
| *C08L 25/10* | (2006.01) | |
| *C08L 75/04* | (2006.01) | |
| *C08K 5/00* | (2006.01) | |

(52) U.S. Cl.
CPC ........ *C08L 67/025* (2013.01); *C08K 5/34924* (2013.01); *C08L 25/10* (2013.01); *C08L 75/04* (2013.01); *C08K 5/005* (2013.01); *C08L 2207/04* (2013.01)

(58) Field of Classification Search
CPC .......... C08L 67/02; C08L 25/10; C08L 75/04; C08L 2207/04; C08G 63/91; C08G 2120/00; C08G 2125/00; C08K 5/005; C08K 5/34924
See application file for complete search history.

(56) References Cited

U.S. PATENT DOCUMENTS

| | | | |
|---|---|---|---|
| 2015/0267049 A1* | 9/2015 | Kim | ...................... C08L 67/025 |
| | | | 524/222 |
| 2015/0299458 A1* | 10/2015 | Kaushik | .................. C08L 67/00 |
| | | | 524/502 |
| 2018/0079887 A1 | 3/2018 | Chino et al. | |

FOREIGN PATENT DOCUMENTS

| | | | | |
|---|---|---|---|---|
| CN | 103642017 A | * | 3/2014 | ............ B29C 49/00 |
| JP | 2005-75864 A | | 3/2005 | |
| JP | 2005-255775 A | | 9/2005 | |
| KR | 10-1258021 B1 | | 4/2013 | |
| KR | 10-1762792 B1 | | 7/2017 | |
| KR | 10-2017-0133407 A | | 12/2017 | |

OTHER PUBLICATIONS

International Search Report issued in PCT/KR2018/016716 (PCT/ISA/210), dated Apr. 5, 2019.

* cited by examiner

*Primary Examiner* — Robert S Jones, Jr.
(74) *Attorney, Agent, or Firm* — Birch, Stewart, Kolasch & Birch, LLP

(57) ABSTRACT

Disclosed are: a thermoplastic elastomer resin composition comprising a thermoplastic elastomer resin and, as a reactive additive, a compound containing one or more isocyanurate functional groups; a molded product comprising the same.

3 Claims, No Drawings

THERMOPLASTIC ELASTOMER RESIN COMPOSITION

TECHNICAL FIELD

The present invention relates to a thermoplastic elastomer resin composition, and more specifically, a thermoplastic elastomer resin composition with reduced amount of outgassing generated during injection molding.

Background Art

Based on good heat resistance, chemical resistance and durability, thermoplastic elastomer resins are used in various forms across industries such as electric/electronic materials, biomaterials, automotive materials, etc., replacing the existing materials. In particular, thermoplastic polyester elastomer resins are used for CV joint boots, gearbox bellows, air ducts, etc. in automotive parts. Such automotive parts are manufactured by blow molding wherein they are produced through the blowing procedure in molten state. Thus, the resin in molten state should have a high melt viscosity and a high melt strength, and should maintain parison form during injection blowing.

In order to realize such characteristics for materials for blow molding, reactive additives have been used. If such a reactive additive is used, as well as realizing the characteristics for blow molding, it is also possible to impart good heat resistance to the molded article.

However, as for conventional reactive additives, there is a problem that such additives unreacted during the reaction extrusion may remain in the molded articles. The remaining reactive additives generate gases out during the blow molding, and they are gradually accumulated on the mold, thereby causing deposition on mold as the production procedures are repeated. Such substances deposited on mold cause problems in workability such as generation of faulty injection molding, increase in number of cleaning of the mold, etc.

Therefore, it is needed to develop a thermoplastic elastomer resin composition for blow molding which generates less amount of outgassing and thus resolves the problem of deposition on mold.

Problems to be Solved

The purpose of the present invention is to provide a thermoplastic elastomer resin composition which generates less amount of outgassing and thus improves the workability in injection molding.

Technical Means

In order to achieve the above-stated purpose, according to an aspect of the present invention, a thermoplastic elastomer resin composition of any of the following embodiments is provided.

The first embodiment relates to a thermoplastic elastomer resin composition comprising, based on 100 parts by weight of the composition, 95 to 99 parts by weight of thermoplastic elastomer resin; and as reactive additive, 0.2 to 2.5 parts by weight of compound containing one or more isocyanurate functional groups.

The second embodiment relates to the thermoplastic elastomer resin composition of the first embodiment, wherein the thermoplastic elastomer resin comprises thermoplastic polyester elastomer (TPEE), thermoplastic styrene-butadiene elastomer (TPE-S), thermoplastic polyurethane (TPU), or two or more thereof.

The third embodiment relates to the thermoplastic elastomer resin composition of the first embodiment or the second embodiment, wherein the thermoplastic elastomer resin is thermoplastic polyester elastomer (TPEE), and wherein the thermoplastic polyester elastomer comprises hard segment comprising polymerized units derived from aromatic dicarboxylic compound and diol; and soft segment comprising polymerized units derived from polyalkylene oxide.

The fourth embodiment relates to the thermoplastic elastomer resin composition of the third embodiment, wherein the aromatic dicarboxylic compound comprises terephthalic acid, isophthalic acid, 1,5-dinaphthalenedicarboxylic acid, 2,6-dinaphthalenedicarboxylic acid, dimethyl terephthalate, dimethyl isophthalate, or mixture of two or more thereof;

wherein the diol comprises ethyleneglycol, propyleneglycol, 1,4-butanediol, 1,5-pentanediol, 1,6-hexanediol, 1,4-cyclohexanedimethanol, or mixture of two or more thereof; and wherein the polyalkylene oxide comprises polyoxyethylene glycol, polyoxypropylene glycol, polyoxytetramethylene glycol, or mixture of two or more thereof.

The fifth embodiment relates to the thermoplastic elastomer resin composition of the third embodiment or the fourth embodiment, wherein the thermoplastic polyester elastomer is branched by branching agent, and the branching agent comprises glycerol, pentaerythritol, neopentylglycol, or mixture of two or more thereof.

The sixth embodiment relates to the thermoplastic elastomer resin composition of any one of the first to fifth embodiments, wherein the compound containing one or more isocyanurate functional groups comprises hexamethylenediisocyanate-isocyanurate, isophoronediisocyanate-isocyanurate, toluenediisocyanate-isocyanurate, 4,4-cyclohexanebismethylisocyanate-isocyanurate, 4,4'-dicyclohexylmethanediisocyanate-isocyanurate, methylenediphenyldiisocyanate-isocyanurate, or mixture of two or more thereof.

The seventh embodiment relates to the thermoplastic elastomer resin composition of any one of the first to sixth embodiments, which further comprises 0.05 to 1 part by weight of antioxidant.

The eighth embodiment relates to the thermoplastic elastomer resin composition of any one of the first to seventh embodiments, which further comprises additive comprising light stabilizer, heat stabilizer, surface modifier, lubricant, reinforcing agent, dyestuff, pigment, or mixture of two or more thereof.

The ninth embodiment relates to a molded article comprising the thermoplastic elastomer resin composition of any one of the first to eighth embodiments.

Effect of the Invention

According to an embodiment of the present invention relating to a thermoplastic polyester elastomer resin composition which generates less amount of outgassing and thus improves the workability in injection molding, it is possible to manufacture a product with a high viscosity suitable for blow molding by using commercial thermoplastic elastomer resin. In addition, outgassing—which is a problem of reaction extrusion—is reduced, and thus deposition on mold can be prevented and faulty injection molding due to the deposition on mold can also be prevented. As such, the effect of improving the workability in blow molding can be expected.

Furthermore, according to an embodiment of the present invention, it is possible to maintain the mechanical properties at the same or better level as compared with conventional technology, while resolving the problem of deposition on mold according to reduction of outgassing generation. Thus, the present invention can be utilized in manufacturing of blow molding products such as CV joint boots, gearbox bellows, air ducts, etc.

CONCRETE MODE FOR CARRYING OUT THE INVENTION

The present invention is explained in more detail below. Prior to the explanation, it must be noted that the terms and expressions used in the present specification and claims should not be interpreted by restricting them according to conventional or lexical meaning, but should be interpreted with meaning and concept coinciding with the technical idea of the present invention, based on the principle that inventors can properly define the meanings of the terms in order to explain their inventions in the best way.

Therefore, the constitutions illustrated in the embodiments described in the present specification are just preferable ones, and they do not represent all technical ideas of the present invention. Accordingly, it should be understood that at the time of filing the present application, there may be various equivalents and modifications which can replace them.

In addition, "part(s) by weight" described in the present specification means weight ratio between the components included in the thermoplastic elastomer resin composition.

The thermoplastic elastomer resin composition according to one aspect of the present invention comprises, based on 100 parts by weight of the composition, 95 to 99 parts by weight of thermoplastic elastomer resin; and, as reactive additive, 0.2 to 2.5 parts by weight of compound containing one or more isocyanurate functional groups.

The thermoplastic elastomer resin composition according to an embodiment of the present invention can comprise thermoplastic elastomer resin (TPE) as a base resin.

As the thermoplastic elastomer resin, a single conventional thermoplastic elastomer resin or a combination of two or more thereof can be used.

The thermoplastic elastomer resin can comprise, for example, thermoplastic polyester elastomer (TPEE) (including thermoplastic copolyester elastomer), thermoplastic styrene-butadiene elastomer (TPE-S), thermoplastic polyurethane (TPU), or two or more thereof.

According to an embodiment of the present invention, as the thermoplastic elastomer resin, thermoplastic polyester elastomer (TPEE) can be used, and the thermoplastic polyester elastomer (TPEE) can be conventionally used one, and hardness thereof can be controlled by containing a plasticizer. But, the hardness of the thermoplastic polyester elastomer is not especially limited, and it can be selected variously according to the articles to be applied.

The thermoplastic polyester elastomer is thermoplastic polymer wherein rigid hard segment and flexible soft segment are block-copolymerized.

According to an embodiment of the present invention, the hard segment can comprise polymerized units derived from aromatic dicarboxylic compound and diol, and the soft segment can comprise polymerized units derived from polyalkylene oxide.

The aromatic dicarboxylic compound can comprise terephthalic acid (TPA), isophthalic acid (IPA), 1,5-dinaphthalenedicarboxylic acid (1,5-NDCA), 2,6-dinaphthalenedicarboxylic acid (2,6-NDCA), dimethyl terephthalate (DMT), dimethyl isophthalate, or mixture of two or more thereof. Specifically, dimethyl terephthalate can be used.

As the diol, linear aliphatic diol with carbon number of 2 to 8 or cyclic aliphatic diol with carbon number of 3 to 8 can be used, and the diol can comprise, for example, ethyleneglycol, propyleneglycol, 1,4-butanediol, 1,5-pentanediol, 1,6-hexanediol, 1,4-cyclohexanedimethanol, or mixture of two or more thereof. Specifically, 1,4-butanediol can be used.

The polyalkylene oxide can comprise polyoxyethylene glycol, polyoxypropylene glycol, polyoxytetramethylene glycol (PTMEG), or mixture of two or more thereof. Specifically, polyoxytetramethylene glycol can be used.

According to an embodiment of the present invention, the thermoplastic polyester elastomer can branched by branching agent, and this is to increase the melt strength for improving the stability of the strand of polyester elastomer in its production, and thereby to increase the productivity.

The branching agent can comprise glycerol, pentaerythritol, neopentylglycol, or mixture of two or more thereof. Specifically, glycerol can be used.

The thermoplastic polyester elastomer according to an embodiment of the present invention can be prepared generally through melt polymerization consisting of the two steps of oligomerization reaction and polymerization/condensation reaction. Preferably, it can be a branched thermoplastic polyester elastomer.

In an embodiment of the present invention, the branched thermoplastic polyester elastomer can be prepared by adding the above-explained components to a reactor and conducting melt polymerization consisting of the two steps of oligomerization reaction and polymerization/condensation reaction, in the presence of a proper catalyst (for example, tetra-n-butoxy titanium, TBT). The oligomerization reaction can be conducted at 140 to 215° C. for 3 to 4 hours, and the polymerization/condensation reaction can be conducted at 210 to 250° C. for 4 to 5 hours, with reducing the pressure from 760 torr to 0.3 torr in stepwise manner.

In an embodiment of the present invention, considering the mechanical strength and flexibility, the amount of the soft segment in the thermoplastic polyester elastomer can be 5 to 75% by weight, and more specifically 30 to 70% by weight, based on total 100% by weight of the thermoplastic polyester elastomer. In case where the amount of the soft segment in the thermoplastic polyester elastomer satisfies such a range, the hardness of the thermoplastic polyester elastomer is not too high, the flexibility is improved, and high performance of heat resistance can be realized.

According to an embodiment of the present invention, the intrinsic viscosity of the polyester elastomer can be 1.7 to 2.2 dl/g, and more specifically 1.9 to 2.0 dl/g.

The thermoplastic elastomer resin composition of the present invention comprises the compound containing one or more isocyanurate functional groups as reactive additive, in order to increase the melt viscosity and melt strength so that blow molding can be facilitated.

Concretely, the isocyanurate functional group is made by combining three (3) isocyanate compounds together, and has very good stability to heat. In comparison with conventional isocyanate compounds having two reactive groups or less, the isocyanurate functional group has more reactive groups. Thus, it can form urethane bonding with more chains of the thermoplastic elastomer resin, and accordingly shows better performance in increasing the molecular weight and can play a role of improving the heat stability. As a result, according to the use of the compound containing one or more isocyanurate functional groups as reactive additive, the mechanical properties are improved, and at the same time, the viscosity is decreased so that blow molding can be facilitated.

In addition, since the isocyanurate functional group contained in the reactive additive of the present invention has one more isocyanate group as compared with conventional isocyanate compounds, it can perform more reactions with the thermoplastic elastomer resin and thus the possibility of unreacted material's escape is less, and since a compound having isocyanurate functional group itself shows good stability to heat, it is possible to reduce the possibility of on-mold deposition of gas generated out due to decomposition during injection molding.

As the reactive additive, any compound containing one or more isocyanurate functional groups can be used without limitation. For example, the compound containing one or more isocyanurate functional groups can comprise hexamethylenediisocyanate-isocyanurate, isophoronediisocyanate-isocyanurate, toluenediisocyanate-isocyanurate, 4,4-cyclohexanebismethylisocyanate-isocyanurate, 4,4'-dicyclohexylmethanediisocyanate-isocyanurate, methylenediphenyldiisocyanate-isocyanurate, or mixture of two or more thereof, but not limited thereto.

The thermoplastic elastomer resin composition of the present invention comprises, based on 100 parts by weight of the composition, 95 to 99 parts by weight of thermoplastic elastomer resin; and 0.2 to 2.5 parts by weight of the reactive additive.

In an embodiment of the present invention, the amount of the reactive additive can be, based on 100 parts by weight of the composition, specifically 0.3 to 2 parts by weight, and more specifically 0.5 to 1 part by weight. If the amount of the reactive additive based on 100 parts by weight of the composition is less than 0.2 part by weight, the melt viscosity decreases and thus it is difficult to use as a material for blow molding, and if the amount of the reactive additive is greater than 2.5 parts by weight, the generated outgassing amount increases and the deposition on mold occurs, resulting in poor workability in injection molding.

The thermoplastic elastomer resin composition of the present invention can further comprise antioxidant in order to prevent deterioration and oxidation of the thermoplastic elastomer resin in the procedure of injection molding at high temperature.

The kind of antioxidant is not especially limited, and any antioxidant conventionally used in this field of art can be used without limitation. For example, hindered amine-based antioxidant, hindered phenol-based antioxidant, phosphite-based antioxidant, amide-based antioxidant, thioester-based antioxidant, or a mixture of two or more thereof can be used as the antioxidant, but not limited thereto.

More concretely, 4,4'-bis($\alpha,\alpha$-diphenylbenzyl)diphenyl amine, octadecyl-3-(3,5-di-tert-butyl-4-hydroxyphenyl)-propionate, or a mixture of two or more thereof can be used as the antioxidant, but not limited thereto.

The amount of the antioxidant can be, based on 100 parts by weight of the composition, 0.05 to 1 part by weight, and specifically 0.1 to 0.5 part by weight.

In addition to the components explained above, the thermoplastic elastomer resin composition of the present invention can further comprise one or more additives conventionally used in thermoplastic elastomer resin compositions. Such an additive can be, for example, light stabilizer, heat stabilizer, surface modifier, lubricant, reinforcing agent, dyestuff, pigment, or mixture of two or more thereof, but not limited thereto. Silicone resin is an example of the surface modifier among them, but not limited thereto. When compounding with the thermoplastic elastomer resin and being injected into a mold, the surface modifier migrates to the surface of the injection-molded article and protects the surface, and at the same time, it provides the effect of easy release from the injection mold and thus can increase the moldability.

The amount of the additive is not especially limited, and it can be used without limitation within the scope not adversely affecting the properties desired in the present invention. For example, the amount of the additive can be, based on 100 parts by weight of the composition, 0.1 to 5 parts by weight, and specifically 0.5 to 3 parts by weight, but not limited thereto.

The thermoplastic elastomer resin composition according to an embodiment of the present invention can be prepared by feeding the above-explained thermoplastic elastomer resin, reactive additive, and selectively antioxidant and optional additive into an extruder, and conducting extrusion while mixing them in the extruder.

As the extruder, a twin-screw or single-screw extruder can be used, and L/D (length/diameter) of the extruder can be 20 to 35, but not limited thereto.

As the extrusion condition, the extruder temperature of 180 to 220° C. and RPM of 150 to 350 can be used, but not limited thereto.

The thermoplastic elastomer resin composition of the present invention prepared as above has high melt viscosity and high melt strength, and thus can be utilized as a material for blow molding.

According to other aspect of the present invention, a molded article comprising the thermoplastic elastomer resin composition is provided.

The molded articles provided according to an embodiment of the present invention can be CV joint boots, gearbox bellows or air ducts of cars.

In order to facilitate understanding, the present invention is explained in more detail through the following examples. However, examples according to the present invention can be modified to other types variously, and it should not be interpreted that the scope of the present invention is limited to the following examples. The examples of the present invention are provided in order to explain the present invention more completely to a skilled person in the art.

EXAMPLES

<Preparation of Thermoplastic Polyester Elastomer Resin>

Preparation Example 1

Preparation of TPEE with Shore Hardness-D of 40

Dimethyl terephthalate (DMT) (34.60 parts by weight), 1,4-butanediol (25.0 parts by weight), polyoxytetramethylene glycol (PTMEG) with molecular weight of 2,000 (40.20 parts by weight) and glycerol (0.065 part by weight) were put into a reactor for oligomerization, and as a catalyst, tetra-n-butoxy titanium (TBT) (0.025 part by weight) was added thereto. The reaction temperature was elevated from 140° C. to 215° C. for 120 minutes, and while maintaining 215° C., the reaction was conducted for additional 120 minutes. The reaction was terminated at the timing when the reaction ratio calculated from the amount of methanol as reaction effluent became 99% or higher. Then, the catalyst TBT (0.04 part by weight) and a heat stabilizer (Irganox 1010) (0.07 part by weight) were added, and the polymerization/condensation reaction was conducted. The polymerization/condensation reaction was conducted by elevating the temperature from 215° C. to 250° C. for 120 minutes and reacting for additional 120 minutes while maintaining 250° C. At that time, the pressure was lowered from 760 torr to 0.3 torr for 1 hour, and set to a vacuum condition of 0.3 torr or lower for the remaining 3 hours, but the final pressure was controlled to be 0.3 torr or lower, to prepare TPEE with shore hardness-D of 40. The intrinsic viscosity of the TPEE prepared as above was 1.7 dl/g when measured in a solvent of phenol/tetrachloroethane=50/50.

<Preparation of Thermoplastic Elastomer Resin Composition>

Examples 1 to 4 and Comparative Examples 1 to 5

The resin compositions of the Examples and Comparative Examples were prepared according to the compositional ratios described in the following Table 1. The raw materials consisting of the TPEE resin prepared in the above Preparation Example 1 and the additives were fed simultaneously into a twin-screw extruder and then extruded. The temperature of the extruder was set to 150° C. at the hopper and 190° C. to 230° C. at the other parts for extrusion, a twin screw (L/D=40) was used, the diameter of the die was 26 phi, and two (2) kneading blocks were used. The feed rate of the resin was set to be 10 kg/hr to 12 kg/hr, and the rotation speed of the extruder screw was set to be 150 rpm to 200 rpm for extrusion.

Thereafter, the resin composition obtained from the extrusion procedure was cooled in a cooling bath, and then pelletized to prepare pellets of the thermoplastic elastomer resin composition.

(1) Tensile strength: evaluated according to ASTM D638

(2) Tensile elongation ratio: evaluated according to ASTM D638

(3) Modulus: evaluated according to ASTM D638

(4) Melt index: measured at 230° C. under 10.0 kg load after retention for 3 minutes according to ASTM D1238

(5) Outgassing: measured through GC/MS analysis by assessing the gases generated during GC/MS analysis at

TABLE 1

| Composition (% by weight) | Examples | | | | Comparative Examples | | | | |
|---|---|---|---|---|---|---|---|---|---|
| | 1 | 2 | 3 | 4 | 1 | 2 | 3 | 4 | 5 |
| TPEE | 97.9 | 97.8 | 97.1 | 95.6 | 98.0 | 95.1 | 97.6 | 97.1 | 95.6 |
| Reactive additive | 0.2 | 0.3 | 1.0 | 2.5 | 1.0 | 3.0 | — | — | — |
| Naphthalene diisocyanate | — | — | — | — | — | — | 0.5 | 1.0 | 2.5 |
| Silicone resin | 0.5 | 0.5 | 0.5 | 0.5 | 0.5 | 0.5 | 0.5 | 0.5 | 0.5 |
| Heat stabilizer | 1 | 1 | 1 | 1 | 1 | 1 | 1 | 1 | 1 |
| Antioxidant 1 | 0.2 | 0.2 | 0.2 | 0.2 | 0.2 | 0.2 | 0.2 | 0.2 | 0.2 |
| Antioxidant 2 | 0.2 | 0.2 | 0.2 | 0.2 | 0.2 | 0.2 | 0.2 | 0.2 | 0.2 |

<Explanation of the Components>

TPEE: The thermoplastic polyester elastomer prepared in Preparation Example 1

Reactive additive: Hexamethylenediisocyanate(HDI) isocyanurate (trimer) (TLA-100, Asahikasei Co., Ltd.)

Naphthalene diisocyanate: HARTDUR 115 (Johnson fine chemical Co., Ltd.)

230° C. for the same amount of the sample, and calculating the total area of the gases generated out (total outgassing amount)

(6) Deposition on mold: determined by the presence/absence of white deposit on gas bent part of the mold after continuous injection of 50 rectangular samples with 8 cm×6 cm×6.5 mm size

TABLE 2

| | Examples | | | | Comparative Examples | | | | |
|---|---|---|---|---|---|---|---|---|---|
| | 1 | 2 | 3 | 4 | 1 | 2 | 3 | 4 | 5 |
| Tensile strength ($Kg_f$) | 225 | 225 | 220 | 220 | 180 | 215 | 210 | 200 | 230 |
| Tensile elongation ratio (%) | >400 | >400 | >400 | >400 | >400 | >400 | >400 | >400 | >400 |
| Modulus | 642 | 640 | 640 | 635 | 625 | 652 | 650 | 647 | 650 |
| Melt index (g/10 min) | 13 | 12 | 10 | 10 | 25 | 9 | 10 | 9.5 | 9 |
| Outgassing area | $3.1 \times 10^7$ | $3.1 \times 10^7$ | $3.2 \times 10^7$ | $4.1 \times 10^7$ | $2.9 \times 10^7$ | $5.6 \times 10^7$ | $5.1 \times 10^7$ | $5.9 \times 10^7$ | $6.3 \times 10^7$ |
| Deposition on mold | No | No | No | No | No | Yes | Yes | Yes | Yes |

Silicone resin: MB50-010 (Dow Corning Co., Ltd.)

Heat stabilizer: NAUGAURD 445 (Chemtura Co., Ltd.)

Antioxidant 1: Sulfur-based antioxidant (Irganox 412S, BASF Co., Ltd.)

Antioxidant 2: phenol-based antioxidant (SONG 1076, Songwon Industry Co., Ltd.)

For the thermoplastic elastomer resin compositions prepared as above, properties of the following items were measured to confirm the properties thereof, and the results are shown in the following Table 2.

As shown in the above Table 2, in case of Examples 1 to 4 according to the present invention, the mechanical properties such as tensile strength, tensile elongation ratio and modulus were good, and the melt viscosity was also high (low melt index) so as to be suitable as a material for blow molding, and in particular, it could be confirmed that the conventional problem of outgassing generation was remarkably reduced and no deposition on mold was generated.

However, in case of Comparative Example 1 using a smaller amount of the compound containing isocyanurate functional group, the melt viscosity was too low (high melt index) so as not to be suitable as a material for blow molding, and in case of Comparative Example 1 using a larger amount of the compound containing isocyanurate functional group, the amount of outgassing was large and deposition on mold was generated. In case of Comparative Examples 3 to 5 using a conventional isocyanate-based compound instead of the compound containing isocyanurate functional group, even if used in a proper amount, it could be confirmed that the amount of outgassing was large and deposition on mold was generated.

The invention claimed is:

1. A thermoplastic elastomer resin composition comprising, based on 100 parts by weight of the composition,
    97.1 to 97.8 parts by weight of thermoplastic elastomer resin;
    as reactive additive, 0.3 to 1.0 parts by weight of compound containing one or more isocyanurate functional groups;
    0.05 to 1 parts by weight of antioxidant; and
    0.1 to 5 parts by weight of surface modifier,
    wherein the thermoplastic elastomer resin consists of thermoplastic polyester elastomer (TPEE) only,
    wherein the thermoplastic polyester elastomer comprises hard segment comprising polymerized units derived from aromatic dicarboxylic compound and diol; and soft segment comprising polymerized units derived from polyalkylene oxide,
    wherein the thermoplastic polyester elastomer is branched by branching agent, and the branching agent comprises glycerol, pentaerythritol, neopentylglycol, or mixture of two or more thereof,
    wherein the compound containing one or more isocyanurate functional groups comprises hexamethylenediisocyanate-isocyanurate,
    wherein the aromatic dicarboxylic compound comprises terephthalic acid, isophthalic acid, 1,5-dinaphthalenedicarboxylic acid, 2,6-dinaphthalenedicarboxylic acid, dimethyl terephthalate, dimethyl isophthalate, or mixture of two or more thereof,
    wherein the diol comprises ethyleneglycol, propyleneglycol, 1,4-butanediol, 1,5-pentanediol, 1,6-hexanediol, 1,4-cyclohexanedimethanol, or mixture of two or more thereof,
    wherein the polyalkylene oxide comprises polyoxyethylene glycol, polyoxypropylene glycol, polyoxytetramethylene glycol, or mixture of two or more thereof, and
    wherein the surface modifier comprises a silicone resin.

2. The thermoplastic elastomer resin composition of claim 1,
    which further comprises additive comprising light stabilizer, heat stabilizer, lubricant, reinforcing agent, dyestuff, pigment, or mixture of two or more thereof.

3. A molded article comprising the thermoplastic elastomer resin composition of claim 1.

* * * * *